(12) United States Patent
Lindsay

(10) Patent No.: US 7,901,007 B2
(45) Date of Patent: Mar. 8, 2011

(54) SELF-RAISING HEADREST FOR VEHICLE SEAT AND METHOD

(75) Inventor: Derek Lindsay, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/849,265

(22) Filed: Aug. 31, 2007

(65) Prior Publication Data
US 2009/0058149 A1 Mar. 5, 2009

(51) Int. Cl.
*A47C 1/00* (2006.01)
(52) U.S. Cl. ............... 297/410; 297/391; 297/378.1; 297/61
(58) Field of Classification Search ............ 297/410, 297/391, 378.1, 61
See application file for complete search history.

(56) References Cited

U.S. PATENT DOCUMENTS

| | | | |
|---|---|---|---|
| 2,989,341 A | 6/1961 | Schliephacke | |
| 3,057,657 A * | 10/1962 | Fletcher | 297/61 |
| 3,104,912 A * | 9/1963 | Schliephacke | 297/61 |
| 4,285,545 A | 8/1981 | Protze | |
| 5,681,079 A | 10/1997 | Robinson | |
| 5,918,940 A | 7/1999 | Wakamatsu et al. | |
| 6,192,565 B1 | 2/2001 | Tame | |
| 6,485,096 B1 * | 11/2002 | Azar et al. | 297/61 |
| 6,540,299 B1 | 4/2003 | Gosk et al. | |
| 6,557,933 B1 | 5/2003 | Schambre et al. | |
| 6,726,283 B2 | 4/2004 | Schambre et al. | |
| 6,779,839 B2 * | 8/2004 | Andreasson et al. | 297/61 |
| 6,789,846 B2 * | 9/2004 | Humer et al. | 297/216.12 |
| 6,860,564 B2 * | 3/2005 | Reed et al. | 297/408 |
| 7,059,681 B2 * | 6/2006 | Kubo | 297/410 |
| 7,344,189 B2 * | 3/2008 | Reed et al. | 297/61 |
| 2002/0079723 A1 | 6/2002 | Risch et al. | |

FOREIGN PATENT DOCUMENTS
WO WO94/01302 1/1994
* cited by examiner

*Primary Examiner* — Laurie K Cranmer
(74) *Attorney, Agent, or Firm* — Kenealy Vaidya LLP; Mark E. Duell

(57) ABSTRACT

A vehicle seat that is foldable can include a linkage mechanism for operatively withdrawing the headrest during fold down procedures and automatically extending the headrest to a use position during unfolding procedures of the seat.

20 Claims, 2 Drawing Sheets

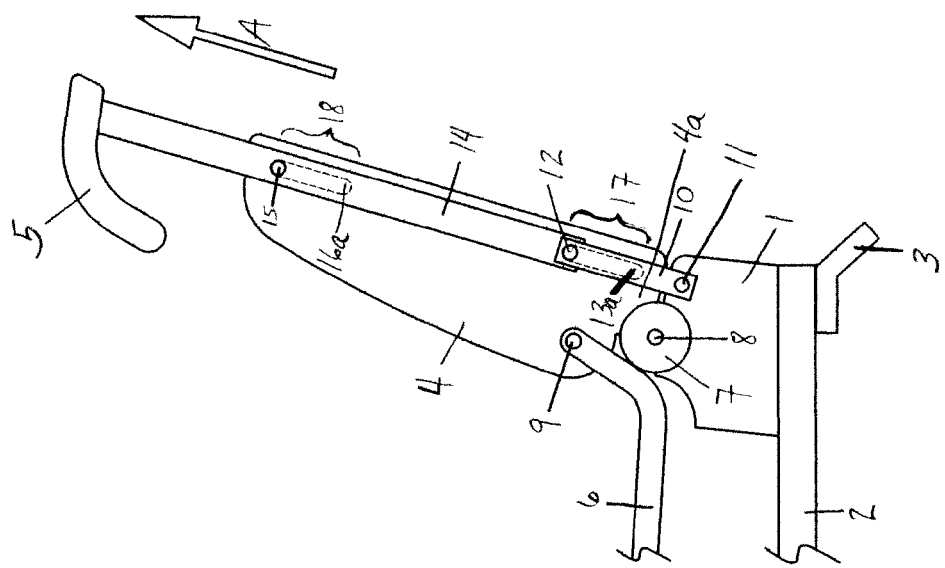
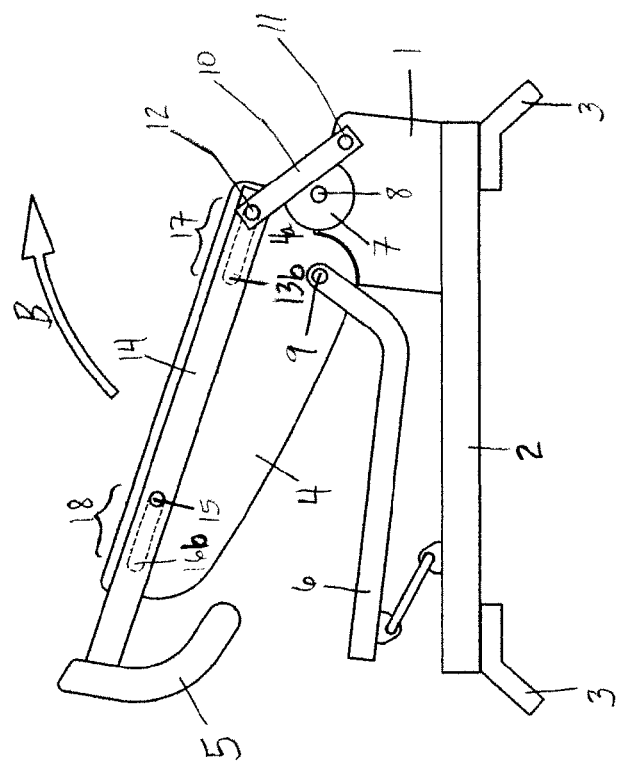

SELF-RAISING HEADREST FOR VEHICLE SEAT AND METHOD

BACKGROUND

1. Field

The disclosed subject matter relates to a self-raising headrest for a vehicle seat. More particularly, the disclosed subject matter relates to a headrest that self-raises in a fold-flat vehicle seat, whereby the headrest that is stowed against the seat upon folding of the seat returns to its extended position upon opening of the seat from the folded position to the unfolded position.

2. Brief Description of the Related Art

Passenger vehicles typically include a multitude of safety features to protect the occupants from harm during impact collisions. For example, seatbelts, airbags and active restraint systems have been employed in vehicles for many years. The safety features are designed to minimize the destructive forceful impact on the vehicle occupants that may be caused, for example, when a vehicle suffers a head-on collision, as well as providing protection when the vehicle is struck from behind in a rear-end collision. The amount and quality of such safety systems may vary among vehicle manufacturers, and most modern manufacturers also incorporate headrest restraints to protect the vehicle occupants in rear-end collisions. An effective headrest is one that is typically located directly behind the centerline of the occupant's head and is positioned no more than about two inches away from the head.

In a front-end collision, the vehicle's forward motion is abruptly stopped. The seat belts and airbags prevent the occupants from hurtling forward. The goal is to maintain the occupant in an upright position and to prevent his/her body from striking into hard surfaces, other occupants, or from being ejected out of the vehicle.

Conversely, in a rear-end collision, the impact forces are directed in the opposite direction. The vehicle is abruptly propelled forward, and the seated occupants are correspondingly thrown backward. Just as the seatbelt and/or airbag holds an occupant in the seat and restricts forward motion, a seatback and head restraint restricts rearward motion in a rear-end collision.

Importantly, the headrest should be positioned so that the occupant's head does not pivot over the headrest in a rearward direction. This pivoting action over the headrest could flex the upper spinal column. For example, an adjustable head restraint placed in a relatively lower position by a shorter person may not fit a subsequent, taller person whose head and upper spinal column can flex over the head restraint in a rear impact collision.

In U.S. Pat. No. 2,989,341, there is described a stationary reclining chair having a headrest that is extended to a predetermined supporting position during the initial reclining movement of the chair. The reclining chair employs a combined guiding and actuating linkage in the form of a double arm actuating lever so that the pivotal mount moves in a prescribed arcuate path about the backrest pivot in response to the user's reclining movement. As the user sits in the upright chair and leans against the backrest, the corresponding force on the linkage engages the linkages and guiding mechanisms of the headrest to the extended position in order to support the back of the user's head. Further application of rearward force against the backrest of the chair causes the extended headrest and backrest to move as a single unit with no relative displacement between the backrest and headrest from the initial inclined position. Thus, the increase in angular relationship between the backrest and the chair seat does not change the relative position of the headrest in relation to the backrest in the further-reclined chair.

Also, PCT publication WO94/01302 provides a vehicle seat having a foldable backrest and a head restraint (i.e., headrest), where the headrest can be retracted into the backrest when folded down, and returned when the backrest is folded up. As the backrest is progressively folded down, a blocking device which normally maintains the backrest in an upright locked position is released, and a link arm pulls a yoke rod downwardly into the backrest, thereby retracting the headrest against the backrest. However, the device contains a significant limitation in that folding the vehicle seat upward returns the headrest to the "lowermost position of the adjustment range", which must then be manually moved upward by hand to a higher adjustment position.

Further, U.S. Patent Publication No. US2002/0079723A1 discloses a mechanical actuating apparatus for a headrest mounted on a seat back which is able to be folded downward. The headrest is reportedly completely retracted from its preadjusted position and then restored to the original position when the seat back is folded upward. The traction device used is a Bowden cable, wherein the traction wire is connected to the headrest holder and allegedly counteracts the pulling force of an energy storing device which pulls the headrest into an extended position. The pivoting movement of the seatback is converted into a rolling-up or unrolling movement to extend or shorten a free length of the cable of the traction device. Unfortunately, the device is particularly limited by the use of such a Bowden cable traction mechanism, since the cable may slide out of position or become jammed.

Therefore, typical vehicle headrest restraints, including those described above, are deficient in their ability to provide a simple mechanism for a self-retracting headrest that minimizes clearance requirements for folding seatbacks. Moreover, a headrest restraint that returns to an extended position immediately upon unfolding of the backrest would be advantageous in providing greater safety for a user who can adequately adjust the headrest to match the user's head location as he/she sits in the vehicle seat, while simultaneously eliminating the situation where the user's head could pivot over the fully-retracted headrest during a vehicle collision.

SUMMARY

According to an aspect of the disclosed subject matter, there is provided a self-raising headrest apparatus for a foldable vehicle seat comprising a headrest frame disposed at the upper end of the foldable vehicle seat, a recliner support bracket containing an upper channel and a lower channel, wherein said recliner support bracket is disposed in the rotational seatback of the foldable vehicle seat, a linkage having an upper end and a lower end, and a pivot point of the rotational seatback of the foldable vehicle seat, wherein the lower end of said headrest frame is operatively interconnected to the upper end of said recliner support bracket, the lower end of said recliner support bracket is operatively interconnected to the upper end of said linkage, and the lower end of said linkage is operatively interconnected to said pivot point, and wherein said linkage rotates together with the seatback about said pivot point of said rotational seatback and the rotation of said linkage causes said headrest frame to raise to an extended position.

In accordance with another aspect of the disclosed subject matter, there is provided a self-raising headrest apparatus as herein described wherein said linkage pushes directly on the headrest frame.

In accordance with yet another aspect of the disclosed subject matter, there is provided a self-raising headrest apparatus as herein described wherein said linkage contacts a spring and said spring in turn contacts the headrest frame to raise the headrest to the extended position.

In accordance with still another aspect of the disclosed subject matter, there is provided a self-raising headrest apparatus as herein described further comprising a spring means for storing or releasing energy from folding or unfolding of said foldable seat and wherein said spring is interposed between said linkage and said headrest frame.

In accordance with another aspect of the disclosed subject matter, there is provided a self-raising headrest apparatus for a foldable vehicle seat comprising a headrest frame disposed at the upper end of the foldable vehicle seat, a recliner support bracket containing an upper channel and a lower channel, wherein said lower channel is formed in a substantially linear configuration, and wherein said recliner support bracket is disposed in the rotational seatback of the foldable vehicle seat, a linkage having an upper end and a lower end, and a pivot point of the rotational seatback of the foldable vehicle seat, wherein the lower end of said headrest frame is operatively interconnected to the upper end of said recliner support bracket, the lower end of said recliner support bracket is operatively interconnected to the upper end of said linkage, and the lower end of said linkage is operatively interconnected to said pivot point, and wherein said linkage rotates together with the seatback about said pivot point of said rotational seatback and the rotation of said linkage causes said headrest frame to raise to an extended position.

In still another aspect of the disclosed subject matter, there is provided a self-raising headrest apparatus as herein described wherein said linkage pushes directly on the headrest frame.

In yet another aspect of the disclosed subject matter, there is provided a self-raising headrest apparatus as herein described wherein said linkage contacts a spring and said spring in turn contacts the headrest frame to raise the headrest to the extended position.

In another aspect of the disclosed subject matter, there is provided a self-raising headrest apparatus as herein described further comprising a spring means for storing or releasing energy from folding or unfolding of said foldable seat and wherein said spring is interposed between said linkage and said headrest frame.

In still another aspect of the disclosed subject matter, there is provided a self-raising headrest apparatus for a foldable vehicle seat comprising a headrest frame disposed at the upper end of the foldable vehicle seat, a recliner support bracket containing an upper channel and a lower channel, wherein said lower channel includes an angled configuration, and wherein said recliner support bracket is disposed in the rotational seatback of the foldable vehicle seat, a linkage having an upper end and a lower end; and a pivot point of the rotational seatback of the foldable vehicle seat, wherein the lower end of said headrest frame is operatively interconnected to the upper end of said recliner support bracket, the lower end of said recliner support bracket is operatively interconnected to the upper end of said linkage, and the lower end of said linkage is operatively interconnected to said pivot point, and wherein said linkage rotates together with the seatback about said pivot point of said rotational seatback and the rotation of said linkage causes said headrest frame to raise to an extended position.

In yet another aspect of the disclosed subject matter, there is provided a self-raising headrest apparatus as herein described wherein said headrest is automatically raised to a fully-extended position upon unfolding of said vehicle seat.

In another aspect of the disclosed subject matter, there is provided a self-raising headrest apparatus as herein described wherein said headrest is automatically lowered to a fully-retracted position upon folding of said vehicle seat.

In still another aspect of the disclosed subject matter, there is provided a self-raising headrest apparatus as herein described wherein said headrest is temporarily stalled and subsequently automatically raised to a fully-extended position upon unfolding of said vehicle seat.

Still other objects, features, and attendant advantages of the disclosed subject matter will become apparent to those skilled in the art from a reading of the following detailed description of embodiments constructed in accordance therewith, and taken in conjunction with the accompanying drawings.

BRIEF DESCRIPTION OF THE DRAWINGS

The disclosed subject matter of the present application will now be described in more detail with reference to exemplary embodiments of the apparatus and method, given only by way of example, and with reference to the accompanying drawings, in which:

FIG. 1 is a side view of a folded down vehicle seat according to an embodiment of the disclosed subject matter;

FIG. 2 is a side view of the vehicle seat of FIG. 1 in an unfolded state;

DETAILED DESCRIPTION OF EXEMPLARY EMBODIMENTS

Figure 3:
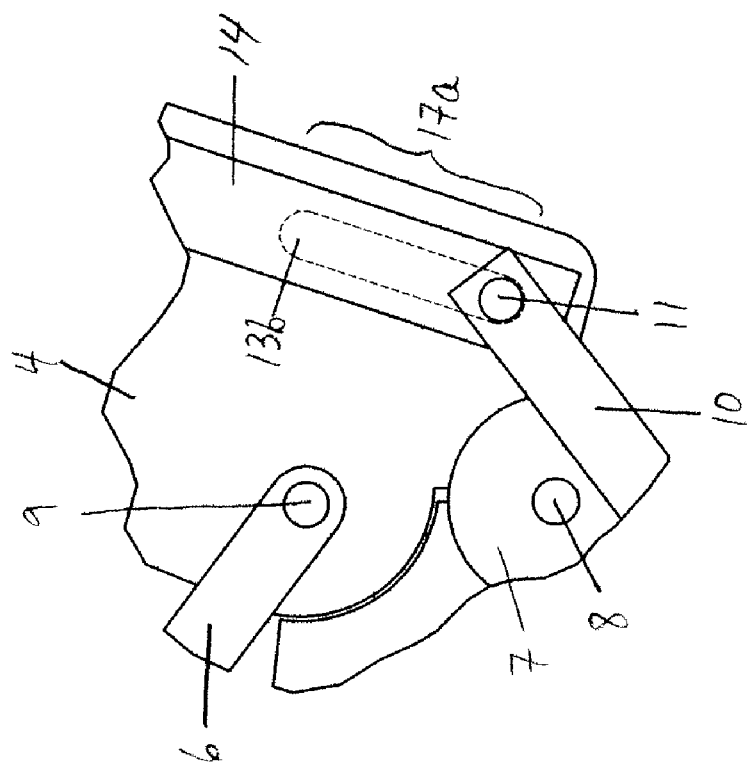
FIG. 3 is a magnified detail view of a self-raising headrest mechanism made in accordance with principles of the disclosed subject matter.

Referring to the drawing figures, like reference numerals designate identical or corresponding elements throughout the several figures.

The foldable seat incorporating aspects according to the presently disclosed subject matter may be present in any portion of the vehicle including the vehicle front row, i.e., where the driver or passenger seat is situated. The foldable seat may also be incorporated into one or more seats located in the second row of the vehicle, which is the row directly located behind the front row driver's seat. Similarly, the foldable seat may comprise one or more seats located in the third or subsequent rows of the vehicle. Accordingly, the vehicle seat could be in a sedan, a sport utility vehicle, a van, a pickup truck, or any other type of vehicle that can incorporate one or more foldable seats.

FIG. 1 shows a foldable vehicle seat in the folded down position. The seat base 1 rests on the horizontal seat frame 2, which is integrally fixed to the seat attachment rails 3,3. The seat attachment rails 3,3 can be mounted onto the vehicle frame or floor structure (not shown) so that the entire foldable seat is securely attached to the vehicle. The seat 6 which a user sits on is movably attached to the backrest 4 at a second pivot axle 9, whereby the second pivot axle 9 permits the seat 6 to travel horizontally to a limited degree toward the rear of the seat base 1 as the backrest 4 is rotated in direction B from a folded position (as in FIG. 1) to an upright position (as shown in FIG. 2).

In the folded position in FIG. 1, the backrest 4 has been rotated downward from an upright position by rotating the backrest 4 about the pivot wheel 7 and its associated first pivot axle 8, in a counterclockwise direction (i.e., direction opposite to direction B). This pivot wheel 7 has a first pivot axle 8 which serves to rotatably connect the backrest 4 to the seat base 1, while simultaneously allowing the backrest 4 to fold downward into a suitable position for stowing the foldable seat. The headrest 5 is shown in its fully retracted position as it nests partially or fully against the backrest 4. This stowable position may also be referred to as the folded position.

FIG. 1 shows a support bracket 14 that includes pins 12 and 15 that are configured to ride in a lower channel 17 and an upper channel 18, respectively. The relatively highest portion 13*b* of lower channel 17 shows the maximum height adjustment position of the second linkage pin 12, and the highest portion 16*b* of the upper channel 18 similarly shows the maximum height adjustment position of the upper adjustment pin 15.

The second linkage pin 12 is also connected to the linkage member 10, and the first linkage pin 11 connects the linkage member 10 to the seat base 1. As the backrest 4 is rotated in direction B, which corresponds to an unfolding or raising of the seat from the folded or stowed position, the lower end 4*a* of the backrest 4 pivots about the first pivot axle 8, and the pivot wheel 7 rotates in a clockwise direction (direction B). Upon further rotation of the backrest 4 in direction B, the first linkage pin 11 restricts the linkage member 10 from any downward movement toward the seat frame 2. Rather, the second linkage pin 12 is progressively driven within the lower channel 17 in a generally upward direction toward the highest portion 13*b* of the lower channel 17. The upper adjustment pin 15, which may be optionally present in the embodiment, is also driven in a generally upward direction toward the highest portion 16*b* of the upper channel 18. The recliner support bracket 14 is correspondingly driven upward with the pins 12 and 15, and the headrest 5 is thereby extended upward as the backrest 4 is unfolded.

The upper and lower channels, 18 and 17, respectively, may each independently be a channel having smooth edges for infinite adjustments of the upper adjustment pin 15 and the second linkage pin 12 within the particular channel. Alternatively, either one or both of the channels (18, 17) may have ridges, contoured edges, or controlled stopping elements along the interior edges, whereby the headrest 5 may be adjusted to a level corresponding to the individual ridge points, contoured edges, or stopping elements. One or more of the upper and lower channels (18, 17) may have polished or lubricated edges, or may have linings of various materials to facilitate relatively smooth or constant movement of the second linkage pin 12 or upper adjustment pin 15 as it travels in the particular channel. In one embodiment, there may be a single channel at the upper or lower region of the recliner support bracket 14 only. However, a second or more additional channels can be provided for added direction and to provide positive stop limits for the headrest.

The linkage member 10 as shown is connected at its lower end via a first linkage pin 11 to the seat base 1. The linkage member 10 is also connected at its upper end via a second linkage pin 12 to the recliner support bracket 14 for travel through the lower channel 17. The second linkage pin 12 is adjustable and is able to travel within the confines of the lower channel 17 from the lowest portion 13*a* of the lower channel 17 to the highest portion 13*b* of the lower channel 17. The channel can be provided in a separate linkage member or other portion of the seat structure. The degree of travel enables a user to adjust the headrest 5 to a desired vertical position to support the back of the user's head.

The action of folding down the backrest 4 in order to stow the entire foldable seat yields a sequence of events that is opposite the procedure described above. For example, as the backrest 4 is rotated downward, the pivot wheel 7 and first pivot axle 8 rotate in a counterclockwise direction. The linkage member 10 also rotates in a generally counterclockwise direction, causing the second linkage pin 12 to descend within the lower channel 17 toward the lowest portion 13*a* of the lower channel 17. Similarly, the upper adjustment pin 15 is correspondingly drawn downward in the upper channel 18 toward the lowest portion 16*a* of the upper channel 18. This action causes the headrest 5 to be retracted or drawn downward as the upper adjustment pin 15 and the second linkage pin 12 are both simultaneously drawn downward as well. In an embodiment where the optional upper adjustment pin 15 is not included, only the second linkage pin 12 travelling within the lower channel 17 operates to retract the headrest 5 as the backrest 4 is folded downward. Further rotation of the entire foldable seat toward the stowed position eventually causes the headrest 5 to be fully retracted into the stowable position. Thus, as shown in FIG. 1, the headrest 5 is stowed in its lowermost (or fully retracted) position in relation to the backrest 4.

In FIG. 2, the foldable seat is shown in its unfolded or upright position. The headrest 5 has been extended in direction A to its maximum height. The backrest 4 and corresponding recliner support bracket 14 are also shown in their generally upright position. The second linkage pin 12 of linkage member 10 is shown in its uppermost adjustment position within the lower channel 17, and the optional upper adjustment pin 15 is correspondingly shown in its uppermost adjustment position within upper channel 18. The linkage member 10 connecting the recliner support bracket 14 to the headrest 5 is also shown in its most upright position relative to the backrest 4.

In the folded seat position as shown in FIG. 1, the seatback has been rotated in a direction opposite to direction B, toward the seat 6. The headrest 5 is shown in the fully retracted position. The upper pin 15 and the lower pin 12 both reside in their respective lowermost adjustable positions, 16*a* and 13*a*, respectively, in the upper and lower channels 18 and 17, respectively. The corresponding linkage member 10 is also shown in its lowermost adjustment position, due to the folded down position of the backrest 4.

FIG. 3 shows an example of the straight lower channel 17*a*. This straight lower channel 17*a* is configured for uniform movement of the first linkage pin 11 toward an upward direction without any great degree of horizontal movement of the first linkage pin 11. In this exemplary configuration, as the seat is unfolded, there is a continuous proportional raising of the headrest (not shown) as the linkage member 10 and associated first linkage pin 11 drive the recliner support bracket 14 in an upward direction. In turn, the recliner support bracket 14 causes the headrest to be pushed upward. As the first linkage pin 11 reaches the highest portion 13*b* of the straight lower channel 17*a*, then the recliner support bracket 14 will correspondingly drive the headrest to its maximum extended position.

Figure 4:
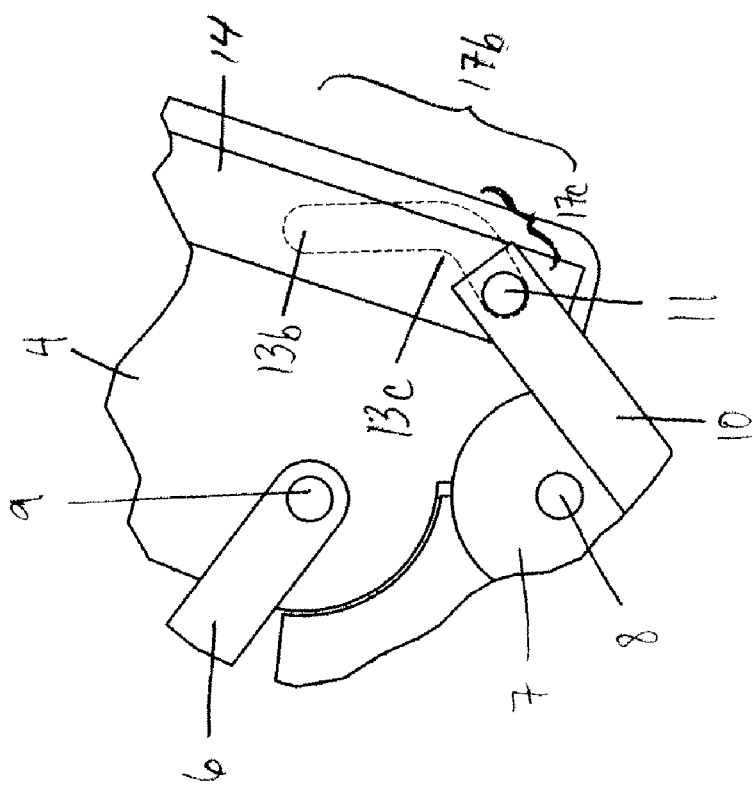
FIG. 4 is a magnified detail view of another self-raising headrest mechanism made in accordance with principles of the disclosed subject matter.

As shown in FIG. 4, the seat can include structures that can provide a stall period during which the headrest is not driven upward during the initial unfolding of the seat. For example, the lower channel 17*b* may optionally be configured in an angled manner which provides a stall zone 17*c* as a portion of this angled lower channel 17*b*. The stall zone feature operates such that the headrest does not raise during the initial stages of raising the seatback. This stalled or delayed raising of the headrest avoids, for example, the rear of any other interior vehicle seat located immediately in front of the foldable seat, or additional interior feature such as a console, until the seatback is unfolded (raised) to a point where the headrest would clear the obstruction. The "stall zone" is that portion of the angled lower channel corresponding to region 17c in FIG. 4.

As the foldable seat which has the incorporated stall zone 17c is raised, the first linkage pin 11 travels in a generally rearwardly direction within the angled lower channel 17b. Once the first linkage pin 11 reaches the interior angle transition point 13c as shown in FIG. 4, the linkage member 10 continues to travel in a generally rearwardly direction, but gradually proceeds in a generally upward direction simultaneously within the angled lower channel 17b. The angled lower channel 17b enables the first linkage pin 11 to travel rearwardly as the seat is unfolded, whereby the linkage member 10 also travels rearwardly to temporarily stall or delay the raising of the headrest. Upon unfolding of the seat, the linkage member 10 and associated first linkage pin 11 do not immediately push the recliner support bracket in an upward motion, but rather the linkage member 10 and associated first linkage pin 11 travel the distance of stall zone 17c from the lowest portion of the angled lower channel 17b until reaching the interior angle transition point 13c of the angled lower channel 17b, wherein the first linkage pin 11 then begins to drive the recliner support bracket 14 in an upward direction and causes the headrest to be pushed upward. Once the first linkage pin 11 reaches the highest portion 13b of the angled lower channel 17b, then the recliner support bracket 14 will in turn have driven the headrest to its fully extended position.

As indicated above, a seat that includes the above-described stall zone 17c may be applied in a second or third row foldable seat where the headrest raising is desirably stalled or temporarily delayed as the seat is unfolded. In the initial stages of unfolding the seat, the linkage member is initially driven generally rearwardly in the stall zone 17c as described. By temporarily delaying or "stalling" the raising of the headrest, interior obstructions may be cleared and the headrest then raises to its fully extended position as the seatback is further opened beyond the stall portion of the adjustment channel. As the seatback reaches the fully unfolded position, the headrest also reaches its maximum extended position.

The headrest can be adjusted to a specified position relative to the bracket 14 after the user has unfolded the seat through the use of typical adjustment mechanisms located between the headrest 5 and the linkage bracket 14.

While certain embodiments of the disclosed subject matter are described above, it should be understood that the disclosed subject matter can be embodied and configured in many different ways without departing from the spirit and scope of the disclosed subject matter. For example, the interface between the linkage member and the recliner support bracket can be configured such that the components are at varying angles with respect to each other and include various connecting structures for connecting to the other vehicle seat components. Furthermore, the specific linkage as shown is not critical. Other various linkages can be used to provide similar kinetic motion to the seat, backrest and headrest.

The embodiments described above provide for direct movement of the headrest 5 via linkage bracket 14. However, it is contemplated that the linkage bracket 14 could release a spring lock when the linkage bracket 14 is moved close to its upward most position. The spring lock would releases a spring that moves the headrest 5 outward by force of the spring. The headrest 5 could then be stowed back away by pushing it back down in the backrest 4 against the compressive force of the spring until the spring lock is again engaged.

Further, while the disclosed subject matter has been described in detail with reference to exemplary embodiments thereof, it will be apparent to one skilled in the art that various changes can be made, and equivalents employed, without departing from the scope of the disclosed subject matter. Each of the aforementioned documents is incorporated by reference herein in its entirety.

What is claimed is:

1. A self-raising headrest apparatus for a foldable vehicle seat comprising:
   a seat;
   a backrest located adjacent the seat and rotatable with respect to the seat between a folded position where the backrest and the seat define an acute angle with the seat and an upright position where the backrest and the seat define an angle that is greater than the acute angle;
   a headrest disposed at an upper end of the backrest and movable along a linear path with respect to the backrest;
   a bracket linkage;
   at least one channel located adjacent the bracket linkage;
   a second linkage having an upper end and a lower end, the upper end rotatable with respect to the seat; and
   a pivot follower pin connecting the bracket linkage to the second linkage, the pin located within the at least one channel for following the channel when the backrest is rotated with respect to the seat;
   wherein the pivot follower pin cooperates with each of the bracket linkage, the channel, and the second linkage to displace the headrest along the linear path when the backrest moves between the folded position and the upright position, respectively.

2. The self-raising headrest apparatus according to claim 1 wherein the bracket linkage is directly connected to the headrest to move the headrest.

3. The self-raising headrest apparatus according to claim 1, wherein the channel is straight such that movement of the backrest causes continuous and substantially corresponding movement of the headrest with respect to the backrest.

4. The self-raising headrest apparatus according to claim 1, wherein the channel is angled such that movement of the backrest causes movement of the headrest with respect to the backrest only after the backrest is moved through an initial portion of an unfolding movement.

5. A self-raising headrest apparatus for a foldable vehicle seat comprising:
   a headrest disposed at an upper end of a backrest of the foldable vehicle seat, the backrest rotatable with respect to a seat of the foldable vehicle seat via a pivot point;
   a recliner support bracket located in the backrest;
   a linkage having an upper end and a lower end; and
   means for moving the headrest relative to the seatback along a linear path when the backrest is moved with respect to the seat, and the means for moving is operatively connected to the recliner support bracket and the linkage, wherein
   a lower end of the headrest is operatively connected to an upper end of the recliner support bracket,
   a lower end of said recliner support bracket is operatively connected to the upper end of the linkage, and
   the lower end of the linkage is operatively connected to a pivot point on the seat.

6. The self-raising headrest apparatus according to claim 5 wherein the bracket pushes directly on the headrest.

7. The self-raising headrest apparatus according to claim 5 wherein the headrest is automatically raised to a fully-extended position upon unfolding of the vehicle seat.

8. The self-raising headrest apparatus according to claim 5 wherein the headrest is automatically lowered to a fully-retracted position upon folding of the vehicle seat.

9. The self-raising headrest apparatus according to claim 5 wherein the headrest is temporarily stalled and subsequently automatically raised to a fully-extended position upon unfolding of said vehicle seat.

10. A method for automatically extending and retracting a vehicle seat headrest, comprising:
providing a seat that is rotatably attached to a backrest, a headrest that is movably coupled to the backrest, a first linkage configured as a rigid lever and connected to the seat, a second linkage configured as a rigid lever and connected to the first linkage, a pivot follower associated with the second linkage, and a channel guide;
rotating the backrest with respect to the seat;
causing the first linkage to rotate with respect to the seat;
moving the second linkage by means of rotation of the first linkage;
directing the second linkage by means of the pivot follower following an extent of the channel; and
moving the headrest relative to the backrest along a linear path via movement of the second linkage.

11. The self-raising headrest apparatus according to claim 5 wherein the means for moving the headrest includes:
a channel adjacent to each upper end of the of the linkage and the lower end of the recliner support bracket; and
a pin pivotally connecting the upper end of the linkage to the lower end of the recliner support bracket and slidably received in the channel.

12. The self-raising headrest apparatus according to claim 11 wherein the means for moving the headrest further includes:
an upper channel on the backrest and spaced from the channel along the linear path; and
a second pin connected to the recliner support bracket and engaging the upper channel.

13. The self-raising headrest apparatus according to claim 12 wherein each of the channel and the upper channel extend along the linear path.

14. The self-raising headrest apparatus according to claim 11 wherein:
the backrest rotates with respect to the seat between a folded position where the backrest and the seat define an acute angle and an upright position where the backrest and the seat define an angle greater than the acute angle;
the channel terminates at a first end and at a second end spaced from the first end; and
the pin abuts the first end of the channel when the backrest is in the folded position and abuts the second end of the channel when the backrest is in the upright position.

15. The self-raising headrest apparatus according to claim 5 wherein:
the backrest rotates with respect to the seat between a folded position where the backrest and the seat define an acute angle and an upright position where the backrest and the seat define an angle greater than the acute angle; and
the means for moving the headrest moves the headrest along the linear path between a retracted position and an extended position when the seatback is moved between the folded position and the upright position, respectively;
the headrest is spaced at a first distance from the backrest when the headrest is in the retracted position and the headrest is spaced a second distance from the backrest that is greater than the first distance when the headrest is in the extended position; and
the first and second distances are located along the linear path.

16. The self-raising headrest apparatus according to claim 1 further comprising:
an upper channel on the backrest and spaced from the at least one channel along the linear path; and
a second pin connected to the recliner support bracket and engaging the upper channel.

17. The self-raising headrest apparatus according to claim 16 wherein the at least one channel and the second channel extend along the linear path.

18. The self-raising headrest apparatus according to claim 16 wherein the at least one channel is angled and the second channel is straight and extends along the linear path.

19. The self-raising headrest apparatus according to claim 1 wherein:
the at least one channel terminates at a first end and at a second end spaced from the first end; and
the pivot follower pin abuts the first end of the at least one channel when the backrest is in the folded position and abuts the second end of the at least one channel when the backrest is in the upright position.

20. The self-raising headrest apparatus according to claim 1 wherein:
the headrest is movable between a retracted position and an extended position when the seatback is moved between the folded position and the upright position, respectively;
the headrest is spaced at a first distance from the backrest when the headrest is in the retracted position and the headrest is spaced a second distance from the backrest that is greater than the first distance when the headrest is in the extended position; and
the first and second distances are located along the linear path.

* * * * *